United States Patent
Ohmi et al.

(10) Patent No.: US 11,041,739 B2
(45) Date of Patent: Jun. 22, 2021

(54) ROTATION SENSOR

(71) Applicant: DENSO CORPORATION, Kariya (JP)

(72) Inventors: Tetsuya Ohmi, Kariya (JP); Michihiro Makita, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 16/420,837

(22) Filed: May 23, 2019

(65) Prior Publication Data
US 2019/0277666 A1    Sep. 12, 2019

Related U.S. Application Data

(63) Continuation of application No. PCT/JP2018/001887, filed on Jan. 23, 2018.

(30) Foreign Application Priority Data

Mar. 13, 2017   (JP) .............................. JP2017-047053

(51) Int. Cl.
*G01D 5/244* (2006.01)
*G01D 5/245* (2006.01)

(52) U.S. Cl.
CPC ............. *G01D 5/245* (2013.01); *G01D 5/244* (2013.01)

(58) Field of Classification Search
CPC ................................ G01D 5/245; G01D 5/244
See application file for complete search history.

(56) References Cited

U.S. PATENT DOCUMENTS

| | | | | |
|---|---|---|---|---|
| 5,705,748 A | * | 1/1998 | Moench | G01D 5/24452 324/207.25 |
| 2009/0045807 A1 | * | 2/2009 | Nishida | G01D 5/145 324/207.2 |
| 2012/0095712 A1 | * | 4/2012 | Komasaki | G01D 3/036 702/94 |
| 2015/0362335 A1 | | 12/2015 | Spitzer et al. | |
| 2016/0223358 A1 | | 8/2016 | Ausserlechner | |
| 2017/0315146 A1 | | 11/2017 | Koeck et al. | |
| 2018/0154926 A1 | * | 6/2018 | Ohira | G01D 5/244 |
| 2018/0292197 A1 | * | 10/2018 | Furukawa | B62D 15/021 |

FOREIGN PATENT DOCUMENTS

JP       2016-023980 A    2/2016

* cited by examiner

*Primary Examiner* — Reena Aurora
(74) *Attorney, Agent, or Firm* — Posz Law Group, PLC

(57) ABSTRACT

The rotation sensor includes a plurality of magnetic sensors for outputting a sine wave signal and a cosine wave signal corresponding to an electrical angle of rotation of the rotating body, and the magnetic sensors are arranged at equal intervals and in a circumferential direction of the rotating body apart from the outer periphery of the rotating body, and are fixed in position so as to detect a change in magnetic field caused by the change in the rotational position of the rotating body due to the rotation of the rotating body. The rotation sensor includes an arithmetic unit, which receives sine wave signals and cosine wave signals from a plurality of magnetic sensors, and adds and subtracts sine wave signals and cosine wave signals according to a predetermined rule, thereby cancels out the high-order components contained in sine wave signals and cosine wave signals.

8 Claims, 7 Drawing Sheets

ROTATION SENSOR

CROSS REFERENCE TO RELATED APPLICATIONS

This application is a continuation application of International Patent Application No. PCT/JP2018/001887 filed on Jan. 23, 2018, which designated the U.S. and based on and claims the benefits of priority of Japanese Patent Application No. 2017-47053 filed on Mar. 13, 2017. The entire disclosure of all of the above applications is incorporated herein by reference.

TECHNICAL FIELD

The present disclosure relates to a rotation sensor that detects an electrical angle of a shaft.

BACKGROUND

The rotation sensor detects rotation of a magnet disposed on an end face of a shaft of a motor by a magnetic field sensitive element.

SUMMARY

The rotation sensor according to an aspect of the present disclosure includes a plurality of magnetic sensors for outputting a sine wave signal and a cosine wave signal corresponding to an electrical angle of rotation of the rotating body, and the magnetic sensors are arranged at equal intervals and in a circumferential direction of the rotating body apart from the outer periphery of the rotating body, and are fixed in position so as to detect a change in magnetic field caused by the change in the rotational position of the rotating body due to the rotation of the rotating body.

In addition, the rotation sensor includes an arithmetic unit, which receives sine wave signals and cosine wave signals from a plurality of magnetic sensors, and adds and subtracts sine wave signals and cosine wave signals according to a predetermined rule, thereby cancels out the high-order components contained in sine wave signals and cosine wave signals.

DETAILED DESCRIPTION

Figure 1:
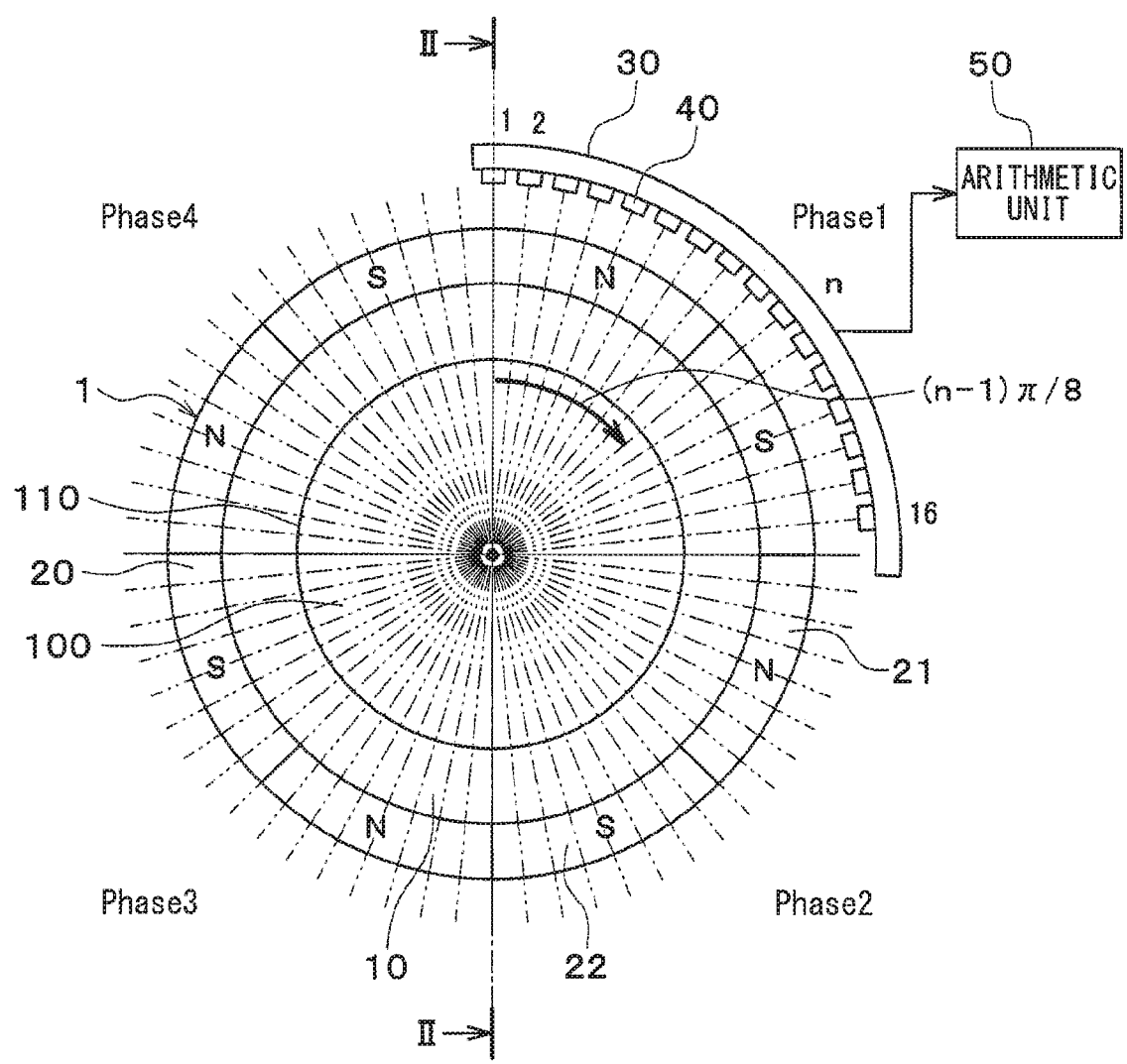
FIG. 1 is a view of a rotation sensor according to a first embodiment of the present disclosure as viewed from an axial direction of a shaft.

Hereinafter, embodiments of the present disclosure will be described with reference to the drawings. In the following embodiments, identical or equivalent elements are denoted by the same reference numerals as each other in the figures.

First Embodiment

Hereinafter, a first embodiment of the present disclosure will be described with reference to the drawings. A rotation sensor according to the present embodiment detects an electrical angle of a shaft utilized for a vector control drive of a motor, for example. The motor is mounted on, for example, a vehicle.

Figure 2:
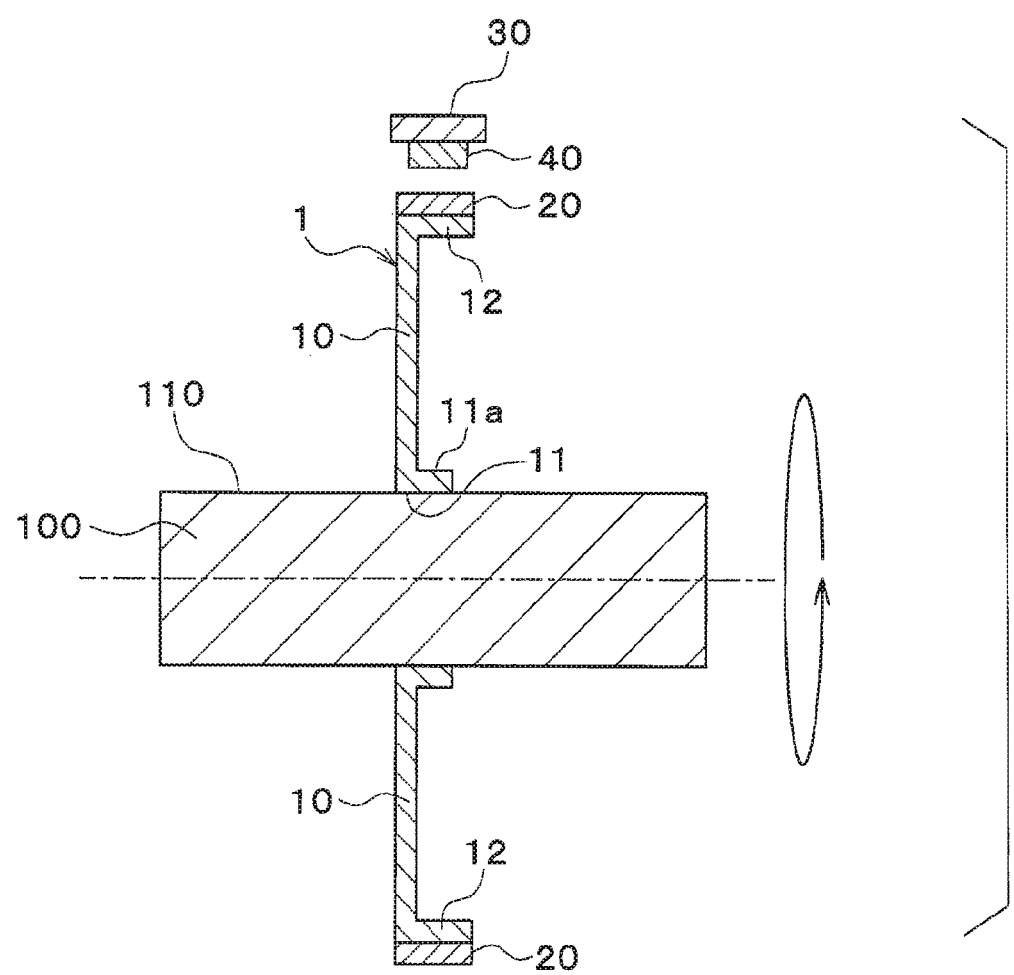
FIG. 2 is a cross-sectional view taken along the line II-II in FIG. 1.

As shown in FIGS. 1 and 2, the rotation sensor 1 includes a disk member 10, a magnetic pattern portion 20, a holding member 30, a plurality of magnetic sensors 40, and an arithmetic unit 50.

The disk member 10 is a component to which the magnetic pattern portion 20 is fixed. The disc member 10 is provided with a press-fitting portion 11a having a through hole 11 through which a shaft 100 constituting a part of the motor is passed. The disc member 10 is fixed to an outer peripheral surface 110 of the shaft 100 by press-fitting the shaft 100 into the press-fitting portion 11a, Therefore, the disk member 10 rotates around the central axis of the shaft 100 together with the shaft 100. The disk member 10 is, for example, a metal plate such as a cold-rolled steel sheet.

The magnetic pattern portion 20 has a magnetic pattern in which a plurality of first magnetic poles 21 generating magnetic force of N pole and second magnetic poles 22 generating magnetic force of S pole are alternately arranged. That is, each of the magnetic poles 21 and 22 are alternately arranged in the circumferential direction around the central axis of the shaft 100.

The magnetic pattern portion 20 is a component for detecting an electrical angle of the shaft 100, and is a component indicating the phase of the shaft 100. The phase indicates the rotational position of the shaft 100. Specifically, the phase means a position in one cycle when the shaft 100 rotates. One cycle corresponds to a pair of ranges of the magnetic poles 21 and 22 constituting the magnetic pattern portion 20.

As shown in FIG. 2, the magnetic pattern portion 20 is provided at an end portion 12 in the radial direction of the shaft 100 on the disk member 10. The magnetic pattern portion 20 is formed by magnetizing a magnetic substance on a base provided at the end portion 12 of the disk member 10.

In the present embodiment, the magnetic pattern portion 20 has eight poles. The shaft 100 is rotated by ¼ to reach one pair of the magnetic poles 21, 22, i.e., 1 (one) period, Therefore, the electrical angle of the ¼ rotation of the shaft 100 becomes 360°. In other words, the electrical angle is an angle corresponding to one rotation range of the rotation range in which one rotation of the shaft 100 is equally divided into a plurality of equal portions. In the present embodiment, since one rotation of the shaft 100 is divided into four equal parts, the electrical angle of ¼ rotation of the shaft 100 becomes 360°.

The holding member 30 is a component on which each magnetic sensor 40 is disposed and which fixes its position with respect to the shaft 100. The holding member 30 has electrical components such as a wiring. The holding member 30 is fixed to a motor case or the like. The holding member 30 may be configured as, for example, a case of a motor or a part of components inside the motor.

The holding member 30 is formed in an arch shape. The arch is an annular ring that is not closed in an annular shape. In other words, the arch shape may also be referred to as the annular portion. The holding member 30 is fixed to the case or the like by moving the concave side of the holding member 30 along the radial direction of the shaft 100. Thereby, the position of the holding member 30 is fixed in position with respect to the shaft 100. The holding member 30 may be semicircular shape as long as it can be inserted with respect to the shaft 100.

Each of the magnetic sensors 40 is a sensor device that detects a change in the magnetic field. Each magnetic sensor 40 is configured as, for example, a Hall element, a GMR element, a TMR element, or an AMR element. In the present embodiment, a Hall element is employed as the magnetic sensor 40. Since the Hall element has a detecting sensitivity in the z direction, the magnetic sensor 40 is arranged parallel to and opposite to the magnetic pattern portion 20 as shown in FIG. 2. The z direction is the direction of the magnetic field passing through the Hall element. In FIG. 2, the z direction coincides with the radial direction of the shaft 100.

Since the period of the output waveform of the AMR element becomes 2 times the period of the output waveform of the other elements, it is necessary to adjust the number of poles of the magnetic pattern portion 20 to ½, but the point of detecting magnetic field is the same as that of the other elements.

Each magnetic sensor 40 is disposed opposite to the magnetic pattern portion 20 via a predetermined gap. Each of magnetic sensors 40 is spaced apart from the outer periphery of the shaft 100 by the holding member 30 and arranged at equal intervals in the circumferential direction of the shaft 100, and is fixed in position with respect to the shaft 100. As described above, one rotation of the shaft 100 is equally divided into four phases. In the present embodiment, all of the magnetic sensors 40 are disposed in the rotation range of Phase 1.

In the present embodiment, 16 (sixteen) magnetic sensors 40 are fixed to the holding member 30. Further, 16 (sixteen) magnetic sensors 40 are disposed at equal intervals at an electrical angle of 0° to 360°. Therefore, the arrangement angle of one magnetic sensor 40 is $(n-1)\pi/8$.

In FIG. 1, "1" indicates the first magnetic sensor, "2" indicates the second magnetic sensor, and "16" indicates the sixteenth magnetic sensor 40. For example, the arrangement angle of the first magnetic sensor 40 is an electrical angle of 0°, and the arrangement angle of the ninth magnetic sensor 40 is an electrical angle of $\pi$, i.e., 180°. Thus, the arrangement angle of each magnetic sensor 40 is predetermined in one rotation range.

Each of the magnetic sensors 40 outputs a sine wave signal and a cosine wave signal corresponding to the electrical angle of the rotation of the shaft 100 by detecting the change in the magnetic field caused by the change in the rotational position of the shaft 100 due to the rotation of the shaft 100. The sine wave signal is a sin signal, and the cosine wave signal is a cos signal. The sin signal and the cos signal are shifted from each other by 90°. Since the respective arrangement angles of the magnetic sensors 40 are different from each other, sin signals and cos signals having different phases are output.

The arithmetic unit 50 is a signal processing circuit that processes the signal of each magnetic sensor 40. The arithmetic unit 50 is configured as, for example, an integrated circuit unit (ASIC). The arithmetic unit 50 receives the sin signal and the cos signal from 16 (sixteen) magnetic sensors 40, and performs a processing for obtaining an electrical angle signal in which high-order components included in the sin signal and the cos signal are canceled by adding and subtracting the sin signal and the cos signal in accordance with the predetermined rule. All arithmetic processing performed by the arithmetic unit 50 is analog processing. The above is the configuration of the rotation sensor 1 according to the present embodiment.

Next, the operation of the rotation sensor 1 will be described. When the shaft 100 rotates in accordance with the operation of the motor, each magnetic sensor 40 outputs a sin signal and a cos signal of a phase corresponding to the arrangement angle of the respective magnetic sensors.

Specifically, the sin signal fn of the nth magnetic sensor 40 becomes $fn=f\{\theta+(n-1)\pi/8\}$, and the cos signal gn becomes $gn=g\{\theta+(n-1)\pi/8\}$. n is 1 to 16.

It is assumed that the amplitude of the ith-order term of the sin signal of the nth magnetic sensor 40 is ani, and the amplitude of the ith-order term of the cos signal of the nth magnetic sensor 40 is bni. Then, it is assumed that the output amplitude of each magnetic sensors 40 is the same. That is, ani=bni=Ai.

In order to remove high-order components of each signal, the arithmetic unit 50 obtains the following F1 to F4 and G1 to G4 from the output of each magnetic sensor 40. These F1 to F4 and G1 to G4 are predetermined to arithmetic expressions.

$$F1=f1 \times g5 \times f9+g13$$

$$G1=g1+f5-g9-f13$$

$$F2=f3-g7-f11+g15$$

$$G2=g3+f7-g11-f15$$

$$F3=f2-g6-f10+g14$$

$$G3=g2+f6-g10-f14$$

$$F4=f4-g8-f12+g16$$

$$G4=g4+f8-g12-f16$$

For example, for F1, the sin signal f1 of the first magnetic sensor 40 is $f1=a11 \times \sin\theta+a12 \times \sin 2\theta+a13 \times \sin 3\theta+\ldots$. Further, the cos signal g5 of the fifth magnetic sensor 40 is $g5=b51 \times \cos(\theta+\pi/2)+b52 \times \cos 2(\theta+\pi/2)+b53 \times \cos 3(\theta+\pi/2)\ldots =-b51 \times \sin\theta-b52 \times \cos 2\theta+b53 \times \sin 3\theta+\theta$ is theta. The sin signal f9 of the ninth magnetic sensor 40 and the cos signal g13 of the thirteenth magnetic sensor 40 also have components according to the phase.

Each of magnetic sensors 40 may be connected in advance to each other so as to output, for example, each of signals F1 to F4 and G1 to G4. That is, in the case of F1, the arithmetic unit 50 does not individually input each signal from each of the first, fifth, ninth and thirteenth magnetic sensors 40 to calculate F1, but inputs the signal itself of F1. The same applies to F2 to F4 and G1 to G4. Since the arithmetic unit 50 does not have to calculate F1 itself, the calculation time can be shortened and the cost of the arithmetic unit 50 can be reduced. In this method, the wirings connected so as to output the respective signals F1 to F4 and G1 to G4 become a part of the arithmetic unit 50.

Therefore, for example, F1 and G1 are the following arithmetic results according to the above rule and the same output amplitude.

$$F1 \approx A1 \times \sin\theta + A5 \times \sin 5\theta + A9 \times \sin 9\theta$$

$$G1 \approx A1 \times \cos\theta + A5 \times \cos 5\theta + A9 \times \cos 9\theta$$

The respective components such as A2 to A4 (second order to fourth order) and A6 to A8 (six order to eighth order) of F1 and G1 are canceled. Then, the arithmetic unit 50 performs the calculation according to the above-described calculation equation not only for F1 and G1, but also for F2 to F4 and G2 to G4. Then, the arithmetic unit 50 obtains signals of sin θ and cos θ by performing the following calculation by using F1 to F4 and G1 to G4.

$$\sin\theta \approx F1 + \sin(\pi/4) \times (F2-G2) + \sin(\pi/8) \times (F4-G3) + \cos(\pi/8) \times (F3-G4)$$

$$\cos\theta \approx G1 + \sin(\pi/4) \times (F2+G2) + \sin(\pi/8) \times (F3+G4) + \cos(\pi/8) \times (F4+G3)$$

The high-order components up to 40 are canceled by F1 and G1 which are the first terms of sin θ and cos θ. Further, the high-order components up to 80 are canceled by sin(π/4)×(F2−G2) and sin(π/4)×(F2+G2) which are the second terms of sin θ and cos θ.

Furthermore, the high-order components up to 160 are canceled by sin(π/8)×(F4−G3)+cos(π/8)×(F3−G4) and sin(π/8)×(F3+G4)+cos(π/8)×(F4+G3) which are the third terms and fourth terms of sin θ and cos θ.

In the above example, although the high-order components up to 160 are canceled, it is possible to cancel up to the high-order components, as appropriate; by the arithmetic unit 50. When the high-order components up to 40 are canceled, the calculation is carried out to the second term. On the other hand, when it is desired to cancel high-order components above 160, the number of magnetic sensors 40 may be increased, and the high-order components above 170 may be canceled by using the fifth term and thereafter.

Figure 3:
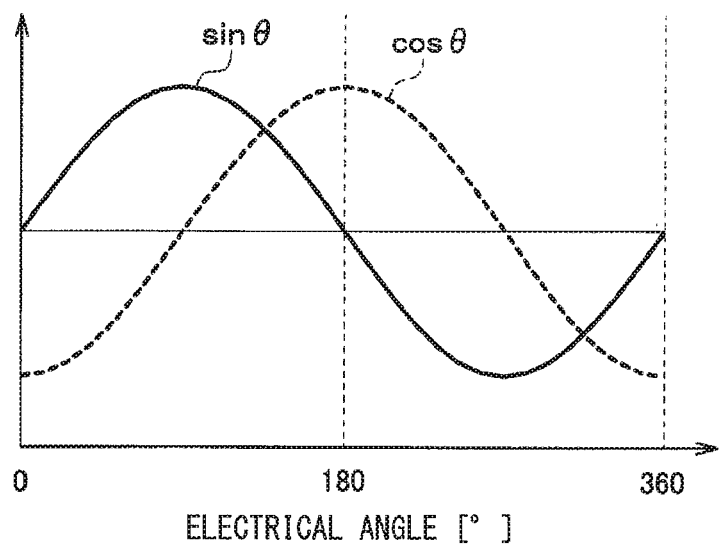
FIG. 3 is a diagram showing each signal of sin θ and cos θ after calculation by an arithmetic unit.

Based on the above calculation, as shown in FIG. 3, each signal of sin θ and cos θ becomes an ideal sin waveform and cos waveform in the range of an electrical angle of 0° to 360°. That is, each signal of sin θ and cos θ, which are extremely small in waveform distortion can be obtained.

Figure 4:
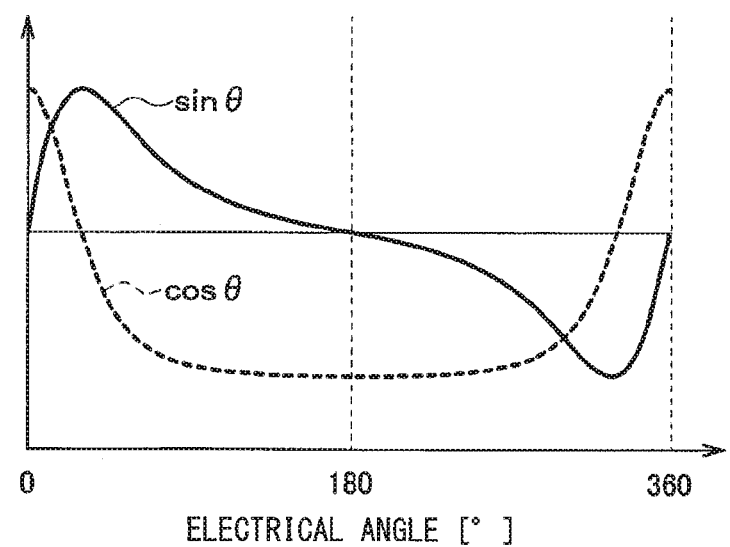
FIG. 4 is a diagram showing signals of sin θ and cos θ output from a first magnetic sensor as a comparative example.

As a comparative example, as shown in FIG. 4, each signal of sin θ and cos θ of only the first magnetic sensor 40 are superimposed on the high-order component, so that the distortion of the signal waveform becomes large. Thus, each signal of sin θ and cos θ of one magnetic sensor 40 does not have an ideal sin waveform and cos waveform, and the waveform is distorted. However, higher-order components included in the sin θ and cos θ signals of one magnetic sensor 40 can be canceled by calculating the signals of the 16 (sixteen) magnetic sensors 40 according to the predetermined rule.

The arithmetic unit 50 calculates Arctan θ from each signal of sin θ and cos θ obtained by the calculation as described above. Since the ¼ rotation of the shaft 100 corresponds to an electrical angle of 0° to 360°, the arithmetic unit 50 acquires a signal component corresponding to the ¼ rotation of the shaft 100. The signal component is a component that increases at a constant rate from 0, and is a voltage component or a current component.

In addition, the arithmetic unit 50 outputs a signal indicating the acquired electrical angle to an external device. The signal indicating the electrical angle may be an analog signal or an A/D converted digital signal. The external device performs vector control drive of the motor based on the signal acquired from the rotation sensor 1.

As described above, in the present embodiment, the high-order components included in the sin signal and the cos signal are canceled by adding/subtracting the signal of each magnetic sensor 40 according to a predetermined arithmetic expression, so that the error components included in the respective signals are removed. This makes it possible to obtain an electrical angle signal with a small distortion, that is, a highly accurate electrical angle, and to accurately obtain the electrical angle of the rotational position of the shaft 100. Therefore, the electrical angle of the shaft 100 can be detected with high accuracy.

The arithmetic unit 50 performs all arithmetic processing in analog processing. Therefore, it is unnecessary to convert each signal of each magnetic sensor 40 into a digital signal. Therefore, the arithmetic unit 50 can calculate the signal indicating the electrical angle at high speed. As a result, even if the shaft 100 rotates at high speed, the difference between the rotational speed and the electrical angle does not occur, so the accuracy of the electrical angle can be ensured.

Further, each magnetic sensor 40 is arranged not on the end face side of the shaft 100 but on the outer peripheral side. Therefore, the rotation sensor 1 does not have to secure a space in the axial direction of the shaft 100, and can provide a configuration that can be installed even when it is difficult to secure a space on the end face side of the shaft 100.

The shaft 100 corresponds to the rotating body, and the disc member 10 corresponds to the fixing portion.

Second Embodiment

Figure 5:
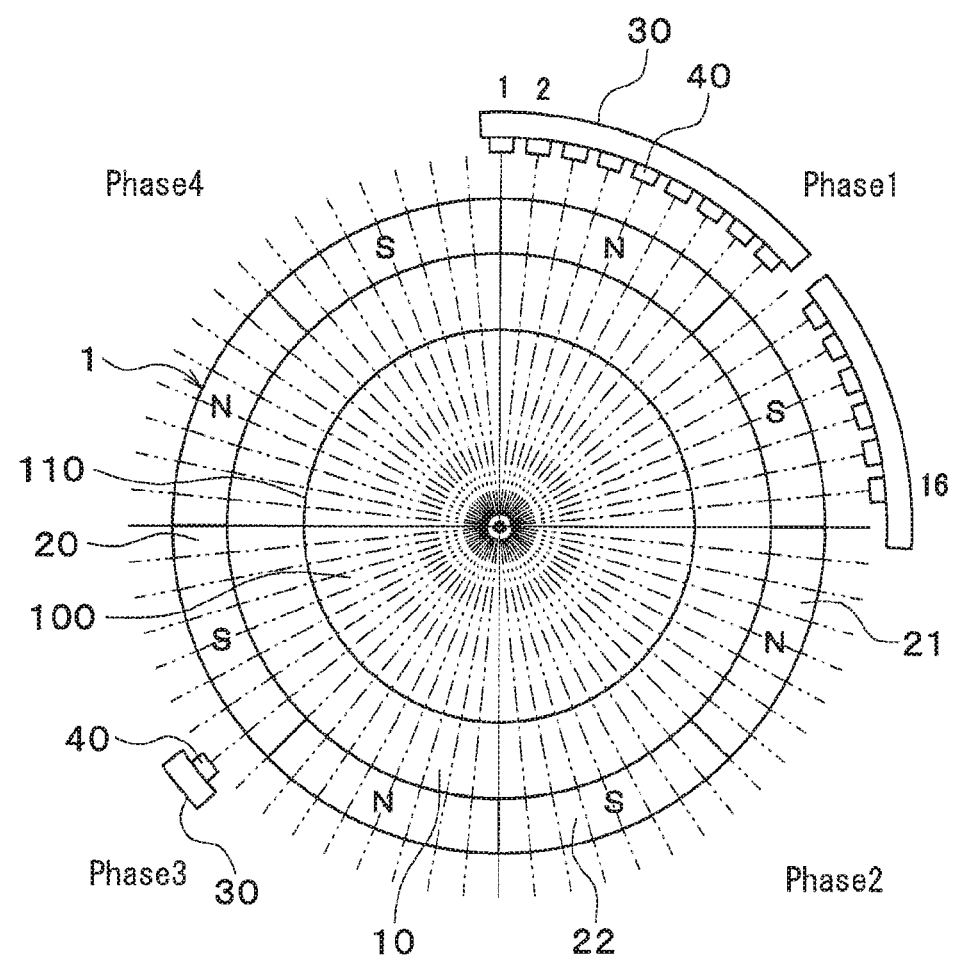
FIG. 5 is a view of a rotation sensor according to a second embodiment of the present disclosure when viewed from the axial direction of the shaft.

In the present embodiment, configurations different from those of the first embodiment will be described. In the present embodiment, as shown in FIG. 5, the tenth magnetic sensor 40 is disposed in the rotation range of diagonal Phase 3. In FIG. 5, the arithmetic unit 50 is omitted.

As described above, in each of the magnetic sensors 40, the arrangement angle in one rotation range is determined in advance. Since each of the magnetic sensors 40 outputs sin signal and cos signal of the phase according to the arrangement angle in the rotation range, as long as the arrangement angle in the rotation range is the same, it may be located in any phase. Therefore, for example, even when all the magnetic sensors 40 can not be mounted in the rotation range of Phase 1, all the magnetic sensors 40 can be disposed on the outer periphery of the shaft 100.

As a modification, the fifth to eighth magnetic sensors 40 may be disposed in the rotation range of Phase 2 and the ninth to twelfth magnetic sensors 40 may be disposed in the rotation range of Phase 3, and the thirteenth to sixteenth magnetic sensors 40 may be disposed in the rotation range of Phase 4. In this manner, the magnetic sensors 40 may be disposed in all of the rotation ranges.

Third Embodiment

Figure 6:
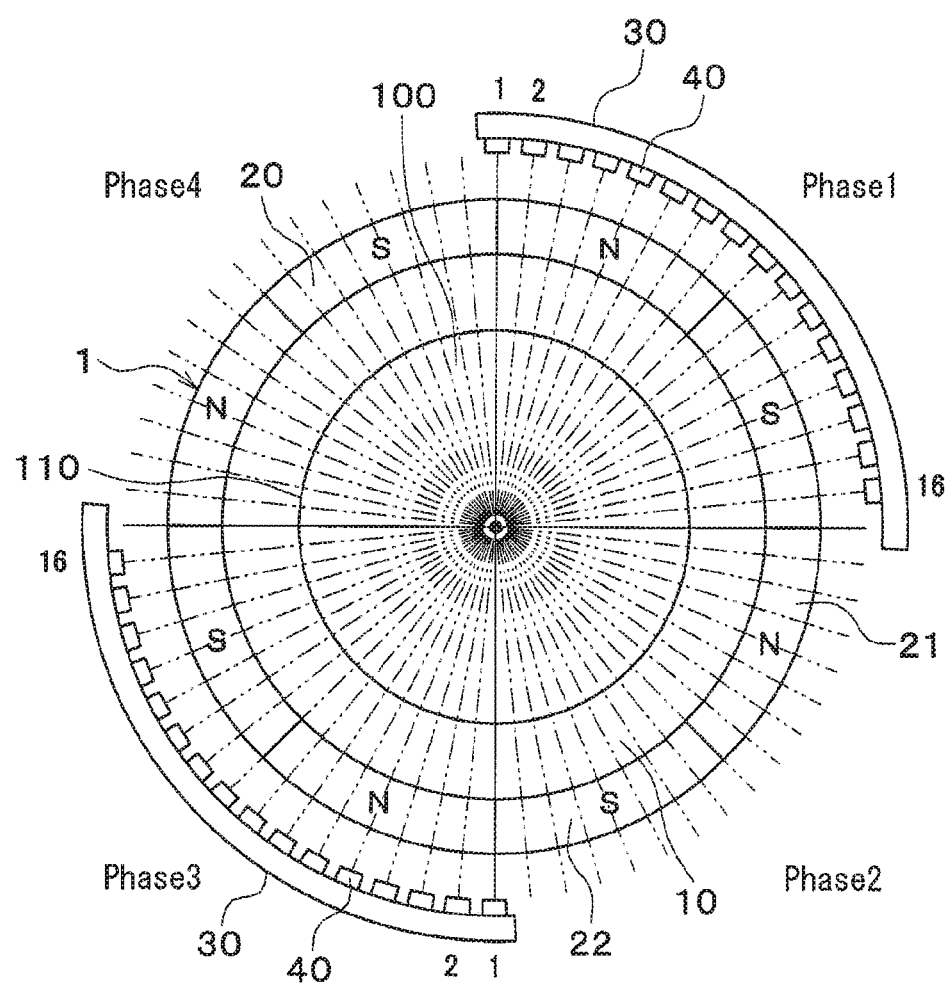
FIG. 6 is a view of a rotation sensor according to a third embodiment of the present disclosure as viewed from the axial direction of the shaft.

In the present embodiment, configurations different from those of the first and second embodiments will be described. As shown in FIG. 6, a pair of magnetic sensors 40 are disposed in the rotation range of Phase 1 and a pair of magnetic sensors 40 is disposed in the rotation range of Phase 3. Thus, two sets of each magnetic sensor 40 may be provided in relation to the shaft 100. In this case, the arithmetic unit 50 acquires electrical angle signals of the two sets of magnetic sensors 40. Thereby, the redundancy of the rotation sensor 1 can be improved.

As a modification, each of the magnetic sensors 40 may be provided on the outer periphery of the shaft 100 with three or more sets. Also, similarly to the second embodiment, different sets of magnetic sensors 40 may be disposed in one rotation range.

Fourth Embodiment

Figure 7:
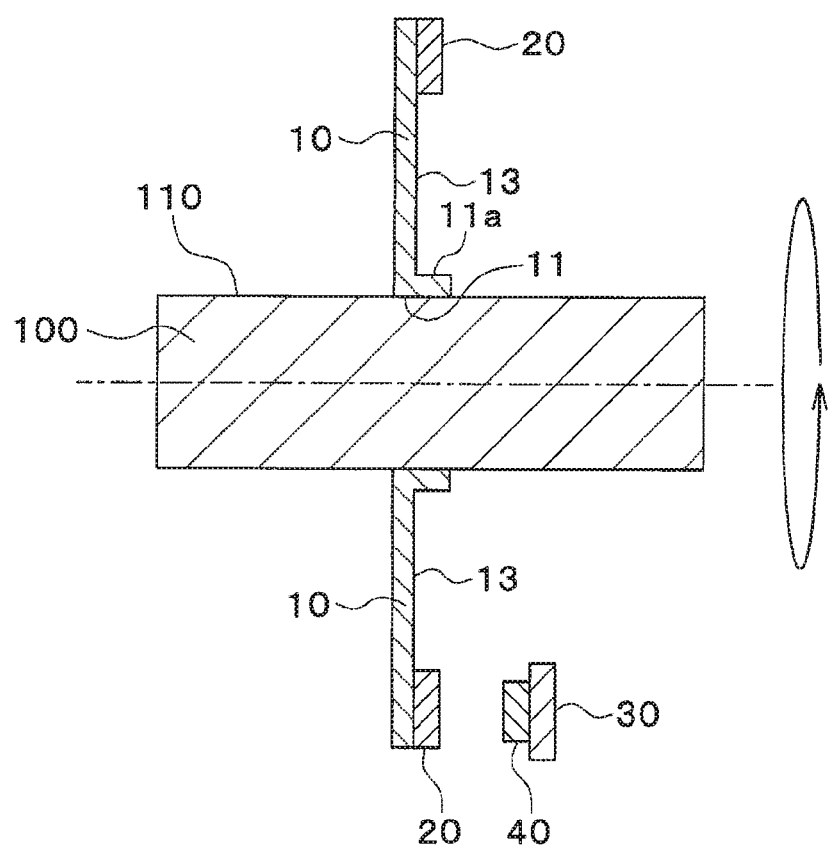
FIG. 7 is a view of a rotation sensor according to a fourth embodiment of the present disclosure when viewed from the axial direction of the shaft.

In the present embodiment, configurations different from those of the first to third embodiments will be described. As shown in FIG. 7, the magnetic pattern portion 20 is provided on the end surface 13 of the disk member 10 parallel to the radial direction of the shaft 100. Each magnetic sensor 40 is disposed opposite to the magnetic pattern portion 20 via a predetermined gap. In this manner, the magnetic pattern portion 20 and each of the magnetic sensors 40 may be disposed in the axial direction of the shaft 100.

Fifth Embodiment

Figure 8:
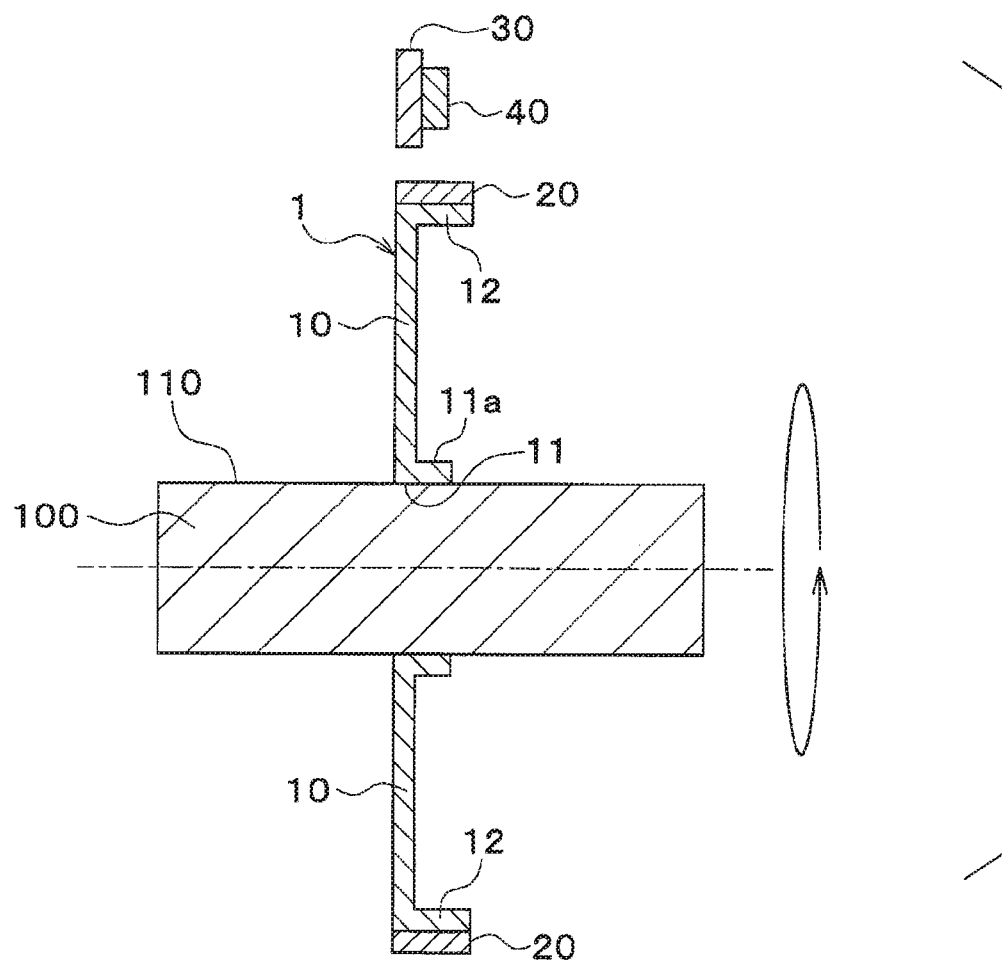
FIG. 8 is a view of a rotation sensor according to a fifth embodiment of the present disclosure as viewed from the axial direction of the shaft.

In the present embodiment, configurations different from those of the first to fourth embodiments will be described. In the present embodiment, the magnetic sensor 40 is constituted by a magnetoresistive element. In this case, since the detection sensitivity of the magnetic sensor 40 is in the x-y plane direction, as shown in FIG. 8, the magnetic sensor 40 is disposed so as to be perpendicularly to and opposite to the magnetic pattern portion 20.

Other Embodiments

The configurations of the rotation sensor 1 described in the above embodiments is an example of the present disclosure, and is not limited to employ the above-described configurations and may employ another configuration embodying the present disclosure. For example, the motor is not limited to one mounted in the vehicle. Further, the configuration for fixing each magnetic sensor 40 is not limited to the configuration shown in each of the above embodiments.

Further, the number of poles of the magnetic pattern portion 20 is an example, and another number of poles may be adopted. Similarly, the one rotation range is not limited to ¼ rotation of the shaft 100. The fixing portion for fixing the magnetic pattern portion 20 is not limited to the disc member 10, and may have other shapes. The shape of the disk member 10 can be appropriately changed according to the type of the magnetic sensor 40.

Furthermore, the rotating body is not limited to the cylindrical shaft 100. For example, the rotor may be a rotor of a resolver. The rotor may has an outer peripheral shape that is not circular but is corrugated. The magnetic sensor 40 is disposed on the outer periphery of the rotor. Therefore, when the rotor rotates, the gap between each magnetic sensor 40 and the outer peripheral surface of the rotor changes, so that each magnetic sensor 40 detects a change in the magnetic field corresponding to the gap.

Although the present disclosure has been described in accordance with the examples, it is understood that the present disclosure is not limited to such examples or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

In an assumable example, a sensor device detects rotation of a magnet disposed on an end face of a shaft of a motor by a magnetic field sensitive element. Specifically, the magnetic field sensitive element is disposed on the central axis of the shaft and is disposed opposite to the magnet. Thereby, the magnetic field sensitive element detects an orientation angle of the magnetic field within the range of 0° to 360° as the shaft rotates.

However, in the above example, since the magnetic field sensitive element is disposed on the central axis of the shaft, the end portion of the motor shaft becomes a mounting area of the sensor device. As a result, the size of the motor is increased in the axial direction of the shaft. In addition, there is a possibility that the sensor device cannot be installed in the motor or the like which cannot secure a space at the end of the shaft. This matter is not limited to the shaft but is common to the rotating body.

On the other hand, it is desirable to detect an accurate electrical angle of the rotating body. For example, vector control drive is known as a method for controlling the motor. The vector control is a method in which the current flowing to the motor is separated into a torque generating component and a magnetic flux generating component, and each of the current components is independently controlled. In order to perform the vector control, it is necessary to detect an accurate electrical angle of the shaft which is the rotating body.

The present disclosure provides a rotation sensor which can detect an electrical angle of a rotating body with high accuracy and can be installed even when it is difficult to secure a space in the axial direction of the rotating body.

The rotation sensor according to an aspect of the present disclosure includes a plurality of magnetic sensors for outputting a sine wave signal and a cosine wave signal corresponding to an electrical angle of rotation of the rotating body, and the magnetic sensors are arranged at equal intervals and in a circumferential direction of the rotating body apart from the outer periphery of the rotating body, and are fixed in position so as to detect a change in magnetic field caused by the change in the rotational position of the rotating body due to the rotation of the rotating body. In addition, the rotation sensor includes an arithmetic unit, which receives sine wave signals and cosine wave signals from a plurality of magnetic sensors, and adds and subtracts sine wave signals and cosine wave signals according to a predetermined rule, thereby cancels out the high-order components contained in sine wave signals and cosine wave signals.

According to this configuration, each magnetic sensor is disposed not on the end face side of the rotating body but on the outer peripheral side. Therefore, it is possible to provide a configuration which can be installed even when it is difficult to secure a space in the axial direction of the rotating body.

Further, high-order components included in the sine wave signal and the cosine wave signal are canceled out by adding/subtracting the signals of the respective magnetic sensors, so that an electrical angle signal with small distortion, that is, a high precision electrical angle can be obtained. Therefore, it is possible to accurately obtain the electrical angle of the rotational position of the rotating body. Therefore, it is possible to provide a configuration capable of detecting the electrical angle of the rotating body with high accuracy.

The invention claimed is:

1. A rotation sensor, comprising:
a plurality of magnetic sensors that are arranged at equal intervals in a circumferential direction of a rotating body away from an outer circumference of the rotating body, are fixed in position, and configured to output a sine wave signal and a cosine wave signal corresponding to an electrical angle of rotation of the rotating body by detecting a change in magnetic field caused by the change in a rotational position of the rotating body due to the rotation of the rotating body; and
an arithmetic unit that receives sine wave signals and cosine wave signals from the plurality of magnetic sensors, and adds and subtracts sine wave signals and cosine wave signals according to a predetermined rule so as to cancel out high order components contained in sine wave signals and cosine wave signals.

2. The rotation sensor according to claim 1, wherein
the electrical angle is an angle corresponding to one rotation range of the rotation range in which one rotation of the rotating body is equally divided into a plurality of parts, and
an arrangement angle of the plurality of magnetic sensors in the one rotation range is previously determined, and the plurality of magnetic sensors are arranged at the arrangement angle in one of the plurality of rotation ranges.

3. The rotation sensor according to claim 1, further comprising
a magnetic pattern portion annularly surrounding an outer peripheral surface of the rotating body, in which a first magnetic pole for generating magnetic force of the N pole and a second magnetic pole for generating magnetic force of the S-pole are alternately arranged; and
a fixing portion to which the magnetic pattern portion is fixed, and fixed to the outer peripheral surface of the rotating body and rotating around a central axis of the rotating body together with the rotating body, wherein
the rotating body is a shaft constituting a motor, and
the plurality of magnetic sensors are disposed to face the magnetic pattern portion, and output an electrical angle signal indicating an electrical angle of the shaft by detecting a change in a magnetic field received from the magnetic pattern portion rotating with the shaft.

4. The rotation sensor according to claim 1, wherein
a plurality of sets of the plurality of magnetic sensors are provided for the rotating body,
the arithmetic unit acquires the electrical angle signal of each of the plurality of sets of the plurality of magnetic sensors.

5. The rotation sensor according to claim 1, wherein
the rotating body is a shaft constituting a motor,
the plurality of magnetic sensors are fixed to a holding member having an arched shape,
the holding member is fixed in position with respect to the shaft by moving a concave side of the holding member along a radial direction of the shaft.

6. The rotation sensor according to claim 1, further comprising
a holding member having an arched shape, whose position is fixed relative to the rotating body, wherein
the rotating body is a shaft constituting a motor,
the plurality of magnetic sensors are fixed to the holding member,
the holding member is fixed in position with respect to the shaft by moving a concave side of the holding member along a radial direction of the shaft.

7. The rotation sensor according to claim 1, wherein
the predetermined rule has a plurality of the arithmetic expressions obtained from a combination of a plurality of sine wave signals and a plurality of cosine wave signals obtained from a plurality of the magnetic sensors.

8. The rotation sensor according to claim 7, wherein
each of the magnetic sensors is wired in advance so as to output the respective signals of the plurality of arithmetic expressions.

* * * * *